US008572426B2

(12) United States Patent
Chan et al.

(10) Patent No.: US 8,572,426 B2
(45) Date of Patent: *Oct. 29, 2013

(54) HARDWARE PERFORMANCE MONITOR (HPM) WITH EXTENDED RESOLUTION FOR ADAPTIVE VOLTAGE SCALING (AVS) SYSTEMS

(75) Inventors: Wai Cheong Chan, Sunnyvale, CA (US); Matthew J. Schade, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/802,020

(22) Filed: May 27, 2010

(65) Prior Publication Data

US 2011/0291729 A1     Dec. 1, 2011

(51) Int. Cl.
*G06F 1/00*     (2006.01)

(52) U.S. Cl.
USPC ......................................................... 713/500

(58) Field of Classification Search
USPC ......................................................... 713/500
See application file for complete search history.

(56) References Cited

U.S. PATENT DOCUMENTS

| | | | |
|---|---|---|---|
| 5,389,843 A | 2/1995 | McKinney | |
| 5,604,775 A | 2/1997 | Saitoh et al. | |
| 5,670,904 A | 9/1997 | Moloney et al. | |
| 6,043,942 A * | 3/2000 | Cunningham et al. | 360/45 |
| 6,094,082 A | 7/2000 | Gaudet | |
| 6,100,735 A | 8/2000 | Lu | |
| 6,121,808 A | 9/2000 | Gaudet | |
| 6,157,247 A | 12/2000 | Abdesselem et al. | |
| 6,194,928 B1 | 2/2001 | Heyne | |
| 6,208,127 B1 | 3/2001 | Doluca | |
| 6,507,247 B2 * | 1/2003 | Langston | 331/47 |

(Continued)

OTHER PUBLICATIONS

Anantha P. Chandrakasan, et al., "Minimizing Power Consumption in Digital CMOS Circuits", Proceedings of the IEEE, vol. 83, No. 4, Apr. 1995, p. 498-523.

(Continued)

*Primary Examiner* — Mohammed Rehman
(74) *Attorney, Agent, or Firm* — Andrew Viger; Wade J. Brady, III; Frederick J. Telecky, Jr.

(57) ABSTRACT

An apparatus includes a delay line having at least two parallel branches, where each branch includes multiple delay cells coupled in series. The delay line is configured to receive an input signal and to propagate the input signal in parallel through the delay cells in the branches. The apparatus also includes multiple sampling circuits configured to sample the input signal at different taps in the branches of the delay line and to output sampled values. The taps in a first of the branches are associated with different amounts of delay compared to the taps in a second of the branches. At least some of the delay cells in the branches of the delay line could have a minimum delay, and a difference in delay between at least one tap in the first branch and at least one tap in the second branch could be less than a smallest of the minimum delays.

20 Claims, 3 Drawing Sheets

(56) References Cited

U.S. PATENT DOCUMENTS

| | | | |
|---|---|---|---|
| 6,535,735 | B2 | 3/2003 | Underbrink et al. |
| 6,548,991 | B1 | 4/2003 | Maksimovic et al. |
| 6,774,705 | B2 | 8/2004 | Miyazaki et al. |
| 6,798,258 | B2 | 9/2004 | Rieven |
| 6,944,780 | B1 | 9/2005 | Kranzen et al. |
| 6,967,522 | B2 | 11/2005 | Chandrakasan et al. |
| 6,985,025 | B1 | 1/2006 | Maksimovic et al. |
| 6,996,730 | B2 | 2/2006 | Bonnett |
| 7,024,568 | B2 | 4/2006 | Maksimovic et al. |
| 7,069,461 | B1 | 6/2006 | Chan et al. |
| 7,075,276 | B2 | 7/2006 | Morales |
| 7,106,040 | B1 | 9/2006 | Maksimovic et al. |
| 7,113,014 | B1 | 9/2006 | Doyle |
| 7,117,378 | B1 | 10/2006 | Maksimovic et al. |
| 7,206,959 | B1 | 4/2007 | Chan et al. |
| 7,224,199 | B1 | 5/2007 | Kang |
| 7,276,925 | B2 | 10/2007 | Dobberpuhl et al. |
| 7,289,921 | B1 | 10/2007 | Salmi et al. |
| 7,319,213 | B2 | 1/2008 | Tsontzidis et al. |
| 7,378,893 | B1 | 5/2008 | Kang |
| 7,426,598 | B2 | 9/2008 | Kwa et al. |
| 7,515,884 | B2 | 4/2009 | Blech et al. |
| 7,675,804 | B2 | 3/2010 | Kawasumi |
| 7,689,845 | B2 | 3/2010 | Narendra et al. |
| 7,742,353 | B2 | 6/2010 | Chen et al. |
| 7,797,083 | B1 | 9/2010 | Brumett, Jr. et al. |
| 7,886,167 | B2 | 2/2011 | Burton |
| 8,004,329 | B1* | 8/2011 | Liu et al. ............ 327/161 |
| 2003/0001650 | A1* | 1/2003 | Cao et al. ............ 327/277 |
| 2008/0309542 | A1* | 12/2008 | Tanizawa ............ 341/163 |
| 2009/0147811 | A1 | 6/2009 | Furuya et al. |
| 2010/0109764 | A1 | 5/2010 | Dathe et al. |
| 2010/0188115 | A1 | 7/2010 | von Kaenel |

OTHER PUBLICATIONS

Noureddine Chabini, et al., "Reducing Dynamic Power Consumption in Synchronous Sequential Digital Designs Using Retiming and Supply Voltage Scaling", IEEE Transactions on Very Large Scale Integration (VLSI) Systems, vol. 12, No. 6, Jun. 2004, p. 573-589.

Noureddine Chabini, et al., "Determining Schedules for Reducing Power Consumption Using Multiple Supply Voltages", 2001 IEEE, p. 546-552.

Fei Li, et al., "Field Programmability of Supply Voltages for FPGA Power Reduction"; IEEE Transactions on Computer-Aided Design of Integrated Circuits and Systems, vol. 26, No. 4, Apr. 2007, p. 752-764.

Hsiang-Hui Chang, et al., "A Wide-Range and Fast-Locking All-Digital Cycle Controlled Delay—Locked Loop", IEEE Journal of Solid-State Circuits, vol. 40 No. 3, Mar. 2005, p. 661-670.

Jong-Tae Kwak et al., "A Low Cost High Performance Register-Controlled Digital DLL for 1 Gbps x32 DDR SDRAM," 2003 Symposium on VLSI Circuits Digest of Technical Papers, pp. 283-284.

Kazuyuki Nakamura et al, "A CMOS 50% Duty Cycle Repeater Using Complementary Phase Blending," IEEE, 2000 Symposium on VLSI Circuits Digest of Technical Papers, pp. 48-49.

Tatsuya Matano et al., "A 1-Gb/s/pin 512-Mb DDRII SDRAM Using a Digital DLL and a Slew-Rate-Controlled Output Buffer," IEEE Journal of Solid-State Circuits, vol. 38, No. 5, May 2003, pp. 762-768.

Jang-Jin Nam et al., "An All-Digital CMOS Duty Cycle Correction Circuit with a Duty-Cycle Correction Range of 15%-to-85% for Multi-Phase Applications," IEICE Trans. Electron, vol. E88-C, No. 4, Apr. 2005, pp. 773-777.

Hsing-Chien Roy Liu, et al., "Hardware Performance Monitor (HPM) With Variable Resolution for Adaptive Voltage Scaling (AVS) Systems", U.S. Appl. No. 12/661,560, filed Mar. 19, 2010.

* cited by examiner

HARDWARE PERFORMANCE MONITOR (HPM) WITH EXTENDED RESOLUTION FOR ADAPTIVE VOLTAGE SCALING (AVS) SYSTEMS

TECHNICAL FIELD

This disclosure is generally directed to power supply systems. More specifically, this disclosure is directed to a hardware performance monitor (HPM) with extended resolution for adaptive voltage scaling (AVS) systems.

BACKGROUND

Many systems use adaptive voltage scaling (AVS) loops to control the supply of power to components of the systems. An example AVS loop may include multiple delay cells coupled in series, where the speed of the delay cells varies based on a supply voltage. A signal can be sent through the delay cells, and the supply voltage can be adjusted until the signal reaches a first of the delay cells and not a second of the delay cells. In this way, the AVS loop can help to estimate the supply voltage necessary to achieve a desired level of performance.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
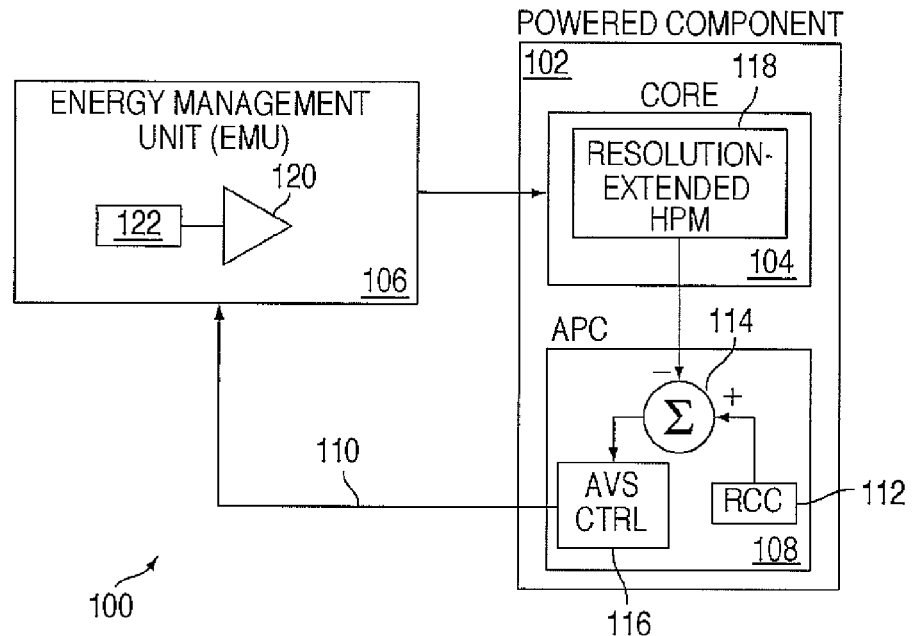
FIG. 1 illustrates an example powered system having a hardware performance monitor with extended resolution for adaptive voltage scaling according to this disclosure.

FIG. 1 illustrates an example powered system 100 having a hardware performance monitor with extended resolution for adaptive voltage scaling (AVS) according to this disclosure. The embodiment of the powered system 100 shown in FIG. 1 is for illustration only. Other embodiments of the powered system 100 could be used without departing from the scope of this disclosure.

As shown in FIG. 1, the powered system 100 includes a powered component 102, which is being powered. The powered component 102 could represent any suitable component that receives operating power, such as a processing device like a microprocessor, microcontroller, digital signal processor, application specific integrated circuit, or field programmable gate array. Note that a processing device represents only one example type of component that could be powered in the system 100. Any other type(s) of powered component(s) could be used in the system 100.

In this example, the powered component 102 includes a core 104, which generally denotes the portion of the powered component 102 responsible for performing core operations of the powered component 102. In a processing device, for example, the core 104 could represent a processing core that executes instructions. The core 104 receives a supply voltage from an energy management unit (EMU) 106. The core 104 includes any suitable structure for performing core processing or other functions in the powered component 102.

The powered component 102 also includes an advanced power controller (APC) 108. The APC 108 performs operations to generate one or more control signals 110, which adjust the supply voltage provided by the EMU 106 to the powered component 102. In this example, the APC 108 includes a reference calibration code (RCC) table 112, which acts as a digital reference for the AVS loop. The RCC table 112 could, for instance, store a digital reference value for each frequency of a clock signal that could be used by the core 104. When the clock frequency used by the core 104 changes, the RCC table 112 could output a different digital reference value. The APC 108 also includes a summer 114 and an AVS control unit 116.

The summer 114 subtracts an output of a hardware performance monitor (HPM) 118 from the appropriate digital reference value provided by the RCC table 112. This provides an indication whether the operation of the core 104 varies from the digital reference and, if any variation is present, the extent of that variation. The AVS control unit 116 uses the output of the summer 114 to generate the control signals 110. For example, if the output of the summer 114 indicates that the core 104 is operating too slowly, the control signals 110 could cause the EMU 106 to increase the supply voltage. If the output of the summer 114 indicates that the core 104 is operating faster than necessary, the control signals 110 could cause the EMU 106 to decrease the supply voltage.

The APC 108 includes any suitable structure for adjusting a regulated signal for a powered component. The RCC table 112 includes any suitable structure for storing and retrieving digital reference values for an AVS loop. The summer 114 includes any suitable structure for combining values. The AVS control unit 116 may include any suitable structure forming an AVS closed-loop system. Details of example advanced power controllers implementing AVS technology can be found in the following U.S. patents, all of which are hereby incorporated by reference: U.S. Pat. No. 7,581,131; U.S. Pat. No. 7,581,120; U.S. Pat. No. 7,493,149; U.S. Pat. No. 7,479,768; U.S. Pat. No. 7,289,921; U.S. Pat. No. 7,117,378; U.S. Pat. No. 7,106,040; U.S. Pat. No. 7,024,568; U.S. Pat. No. 6,985,025; U.S. Pat. No. 6,944,780; U.S. Pat. No. 6,868,503; and U.S. Pat. No. 6,548,991.

The HPM 118 monitors the operation of the core 104. For example, the HPM 118 could measure the propagation delay of digital operations in the core 104. The propagation delay could vary based on a number of factors, such as process, voltage, and temperature (PVT) variations. The HPM 118 outputs a code to the APC 108, where the code identifies the operation of the core 104. The code could, for example, represent a measure of the propagation delay in the core 104.

The HPM 118 includes a delay line having multiple branches coupled in parallel, where each branch includes multiple delay cells coupled in series. A signal is propagated through the delay cells in the delay line through the parallel branches. Taps represent points between delay cells where the signal is sampled and stored. Samples of the signal at the taps can be used by the HPM 118 to determine how far the signal propagates through the delay line in a given period of time. This allows the HPM 118 to measure the propagation delay in the core 104 under a current set of operating conditions.

As described in more detail below, the delay cells in the parallel branches are arranged so that the taps in the parallel branches are not aligned, meaning the taps are associated with different amounts of delay. Also, the delay cells in the parallel branches are arranged so that the minimum delay between taps in different branches can be less than the minimum delay between taps in each individual branch. As a particular example, taps in one branch could be separated by 20 mV delays and taps in another branch could be separated by 30 mV delays, but taps in one branch can be separated by 10 mV delays from taps in the other branch. For this reason, the HPM 118 can be referred to as an "extended resolution" HPM, and the resolution of the HPM 118 is better in at least some areas (such as areas closer to a target tap). One example embodiment of the HPM 118 is shown in FIG. 2, which is described below.

In the example shown in FIG. 1, the EMU 106 includes a voltage regulator 120 and circuitry 122 that adjusts operation of the voltage regulator 120 according to the control signals 110 from the APC 108. In this way, the voltage generated by the voltage regulator 120 can be adjusted based on the measurements taken by the HPM 118. Ideally, the voltage regulator 120 is adjusted until the voltage provides a desired propagation delay in the HPM 118. The EMU 106 includes any suitable structure for generating a controllable output voltage or output current. The voltage regulator 120 includes any suitable structure for generating a regulated voltage. The circuitry 122 includes any suitable circuitry for adjusting operation of the voltage regulator 120.

Although FIG. 1 illustrates one example of a powered system 100 having an HPM 118 with extended resolution for adaptive voltage scaling, various changes may be made to FIG. 1. For example, a system could be used to provide operating power to any suitable type(s) and number(s) of powered component(s). Also, various components shown in FIG. 1 could be combined, further subdivided, omitted, or moved according to particular needs. For instance, the APC 108 could reside outside of the powered component 102, such as in the EMU 106 or outside of the EMU 106. In these cases, the HPM 118 could provide the control signals 110 through one or more I/O pins or other interfaces to the APC 108 or other component. The APC 108 could also reside inside the core 104 of the powered component 102.

Figure 2:
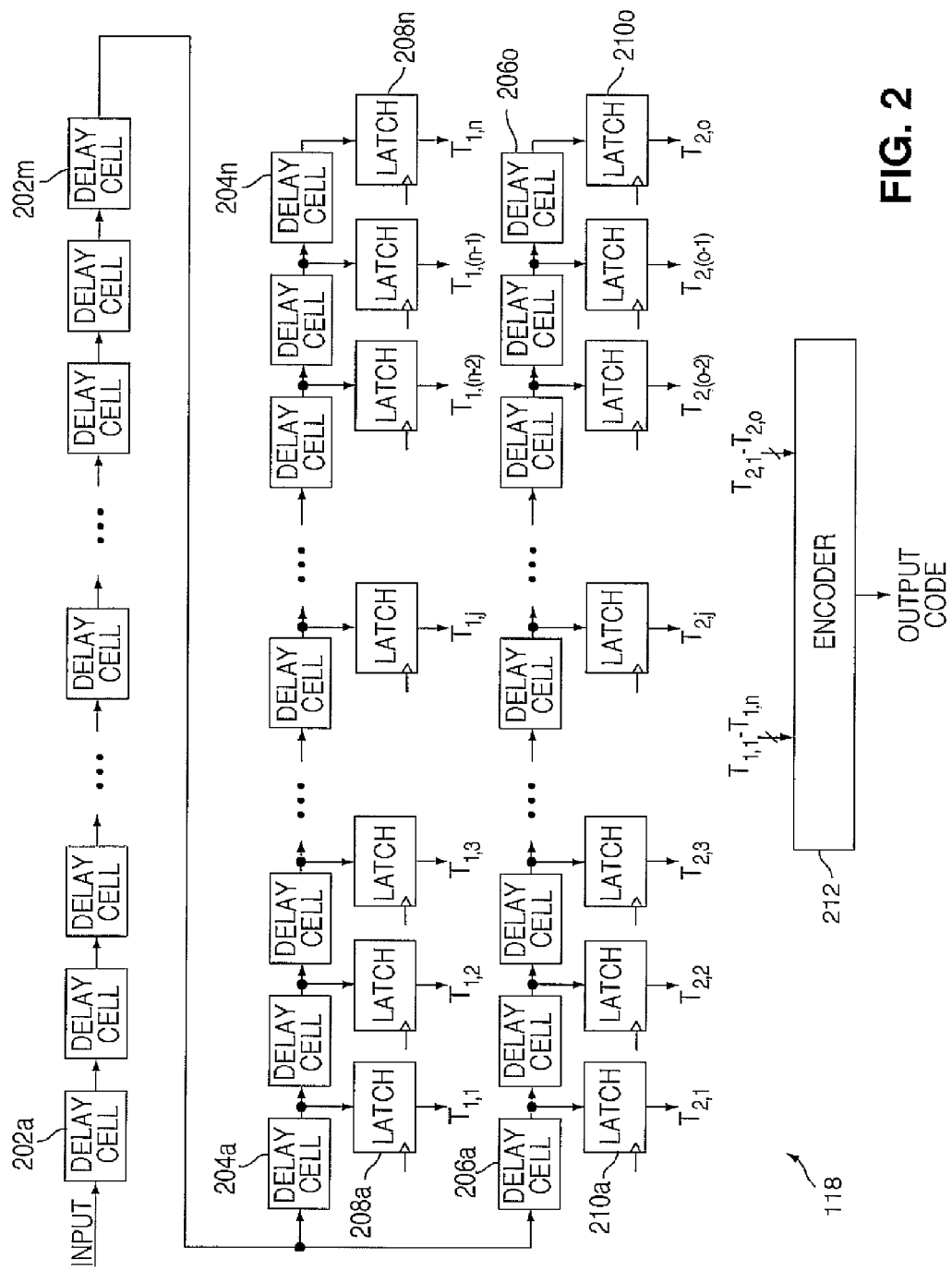
FIG. 2 illustrates an example hardware performance monitor with extended resolution according to this disclosure.

FIG. 2 illustrates an example hardware performance monitor (HPM) 118 with extended resolution according to this disclosure. The embodiment of the HPM 118 shown in FIG. 2 is for illustration only. Other embodiments of the HPM 118 could be used without departing from the scope of this disclosure.

As shown in FIG. 2, the HPM 118 has a delay line that includes delay cells 202a-202m. The delay cell 202a receives an input signal from any suitable source, such as a logic unit that pulses the input signal high at a specified time. The input signal propagates through the delay cells 202a-202m in the delay line, and an amount of delay provided by the delay cells 202a-202m typically varies based on the supply voltage provided by the EMU 106. A delayed input signal that is output by the delay cell 202m is provided to multiple parallel branches of delay cells. In this example, one branch includes delay cells 204a-204n, and another branch includes delay cells 206a-206o. The input signal propagates through the delay cells 204a-204n and 206a-206o in the parallel branches, and an amount of delay provided by the delay cells 204a-204n and 206a-206o typically varies based on the supply voltage provided by the EMU 106. Each of the delay cells 202a-202m, 204a-204n, and 206a-206o includes any suitable structure for delaying a signal, such as multiple inverters coupled in series.

As the signal passes through the parallel branches, the signal is sampled at multiple taps. Each tap denotes a point where a signal is sampled and stored. In FIG. 2, the signal is sampled and stored at multiple taps in the first branch by latches 208a-208n, and the signal is sampled and stored at multiple taps in the second branch by latches 210a-210o. The samples of the signal can be used to identify how far a pulse in the input signal traverses through the parallel branches in a given amount of time. Each of the latches 208a-208n and 210a-210o samples and holds the value of the signal at a specific tap. Each of the latches 208a-208n and 210a-210o includes any suitable structure for sampling a signal, such as a D flip-flop.

Sampled values $T_{1,1}$-$T_{1,n}$ and $T_{2,1}$-$T_{2,o}$ of the signal taken by the latches 208a-208n and 210a-210o are provided to an encoder 212, which encodes the values to generate an output code. For example, as noted above, the samples $T_{1,1}$-$T_{1,n}$ and $T_{2,1}$-$T_{2,o}$ can identify how far a pulse in the input signal traverses through the parallel branches in the delay line during a given amount of time. The encoder 212 can generate an output code that identifies the distance that the signal pulse traverses though the delay line branches. The encoder 212 includes any suitable structure for encoding values to generate output codes.

In some embodiments, a pulse in the input signal traversing through the parallel branches in the delay line may be expected to reach but not exceed a target tap. This means that the pulse is expected to reach the target tap but not any taps following the target tap. When the timing varies (meaning the pulse fails to reach the target tap or reaches any tap following the target tap), the AVS system attempts to adjust the supply voltage provided by the EMU 106. Ideally, the AVS system adjusts the supply voltage quickly and causes a subsequent pulse in the input signal to reach the target tap but not any following taps.

In many applications, the minimum delay provided by each of the delay cells 204a-204n and 206a-206o can be very small, which allows the AVS system to make very fine adjustments to the supply voltage for a powered component. In some applications, however, it may be physically or technically impossible or infeasible to provide delay cells with very small minimum delays. As a particular example, application specific integrated circuits (ASICs) can typically provide delay cells with very small minimum delays, while field programmable gate arrays (FPGAs) often cannot due to inherent routing delays. The inability to use delay cells with very small minimum delays can hinder adjustment of the supply voltage, which can reduce or minimize power-saving efficiency in applications such as low-voltage systems.

In accordance with this disclosure, the taps in the parallel branches of the delay line in FIG. 2 are not aligned in terms of delay. This means that the taps are associated with different amounts of delay as measured from the first delay cell 202a, and this allows a finer resolution to be obtained in the HPM 118. While the taps between delay cells 204a-204n may be separated by a first minimum delay and the taps between delay cells 206a-206o may be separated by a second minimum delay, taps in different branches may be separated by a delay that is smaller than the first or second minimum delays.

Figure 3A:
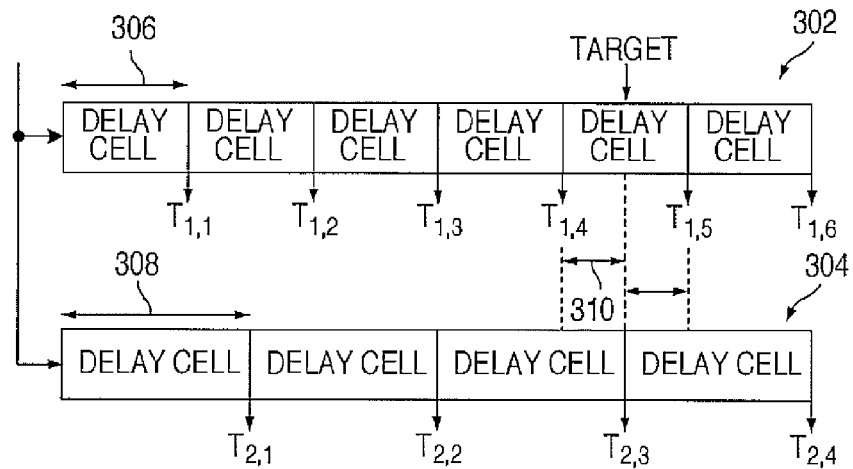
FIGS. 3A and 3B illustrate example techniques for extending the resolution of a hardware performance monitor according to this disclosure.
Figure 3B:
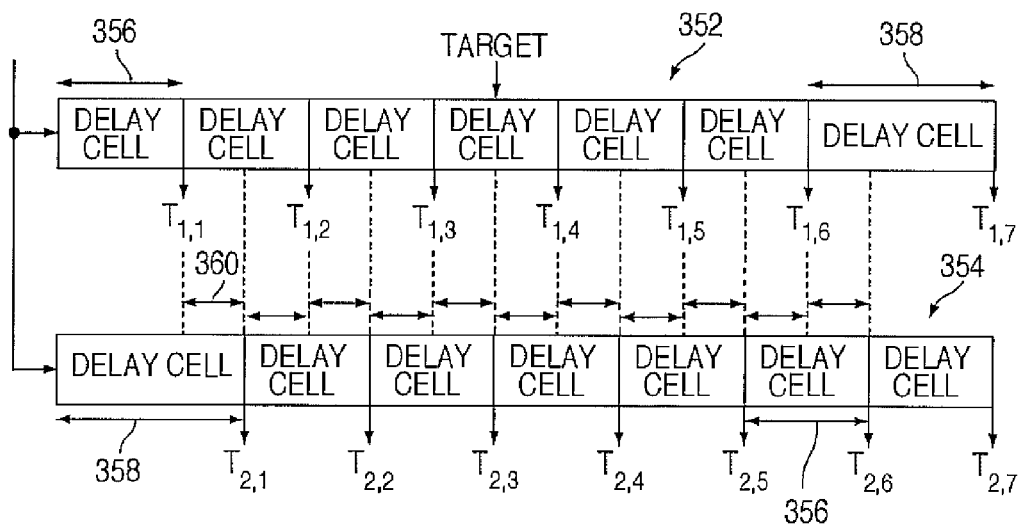

Two examples of this are shown in FIGS. 3A and 3B, which illustrate example techniques for extending the resolution of an HPM according to this disclosure. In FIG. 3A, a branch 302 represents the delay cells 204a-204n, and a branch 304 represents the delay cells 206a-206o. The relative sizes of the delay cells in FIG. 3A denote the different minimum delays that can be measured by the delay cells. The delay cells in the branch 302 provide a smaller minimum delay 306 (such as 20 mV), while the delay cells in the branch 304 provide a larger minimum delay 308 (such as 30 mV). However, the delay cells are arranged so that an even smaller minimum delay 310 (such as 10 mV) can be measured on either side of a target tap, which here denotes tap $T_{2,3}$.

This smaller minimum delay 310 is achieved by using the target tap in one branch and additional taps in the other branch on both sides of the target tap. For example, if a pulse is sampled at the taps $T_{1,3}$ and $T_{2,2}$, the encoder 212 knows that the pulse falls somewhere within the 20 mV window occupied by the fourth delay cell in the branch 302. Similarly, if the pulse is sampled at the taps $T_{1,5}$ and $T_{2,3}$, the encoder 212 knows that the pulse falls somewhere within the 20 mV window occupied by the sixth delay cell in the branch 302. However, if the pulse is sampled at the taps $T_{1,4}$ and $T_{2,2}$, the encoder 212 knows that the pulse falls somewhere within the 10 mV window to the left of the target tap $T_{2,3}$. If the pulse is sampled at the taps $T_{1,4}$ and $T_{2,3}$, the encoder 212 knows that the pulse falls somewhere within the 10 mV window to the right of the target tap $T_{2,3}$.

In other words, the HPM 118 using the structure shown in FIG. 3A can measure delays smaller than the minimum delay measurable by any individual delay cell. This structure can therefore be used to extend or increase the resolution of the HPM 118, even in situations where delay cells measuring smaller delays are not available. The example in FIG. 3A limits the better resolution (delay 310) to the area immediately surrounding the target tap, and each branch 302-304 in FIG. 3A contains a single type of delay cell. Neither is required, however.

FIG. 3B illustrates another example arrangement of delay cells in the HPM 118. In FIG. 3B, a branch 352 represents the delay cells 204a-204n, and a branch 354 represents the delay line formed by the delay cells 206a-206o. Unlike the branches 302-304 in FIG. 3A, the delay cells in each branch 352-354 do not have an equal delay. Rather, the branch 352 includes mostly delay cells with a smaller delay 356 and a delay cell with a larger delay 358. The branch 354 similarly includes mostly delay cells with the smaller delay 356 and a delay cell with the larger delay 358 (but in a different configuration).

The different configurations of the delay cells in the branches 352-354 means that a minimum delay 360 smaller than the delays 356 and 358 can be measured over a larger portion of the branches 352-354. Once again, the HPM 118 using the structure shown in FIG. 3B can measure delays smaller than the minimum delay measurable by any individual delay cell.

As an example, assume that the supply voltage provided to a powered component causes a pulse in the input signal of the HPM 118 to reach as far as tap $T_{2,3}$ (the target tap). Also assume that the smallest measurable delay of any delay cell in the HPM 118 is 20 mV. In conventional HPMs, if the supply voltage varies by 10 mV, this might not result in a change to the supply voltage because the 10 mV change might not be detected/measured using the 20 mV delay cells. In either embodiment shown in FIGS. 3A and 3B, however, a 10 mV change could cause a subsequent pulse in the input signal to only reach tap $T_{1,3}$ or to reach tap $T_{1,4}$. This could be detected by the HPM 118 and used by the AVS system to make a 10 mV adjustment to the supply voltage.

The encoder 212 in the HPM 118 can be designed to process samples from taps in multiple parallel branches of the delay line. In conventional HPMs with a single delay line, a tap value denoting the farthest point where a pulse in the input signal reaches can be directly encoded into a binary format, such as a five-bit binary value.

In accordance with some embodiments of the HPM 118, each parallel delay line could have an equal total delay, and each tap can be mapped by the encoder 212 to a delay associated with the resolution of the overall structure (rather than to the resolution of an individual branch of the delay line). In particular embodiments, this can be done by calculating the total "length" of the parallel branches in terms of the smallest achievable resolution in the HPM 118. The encoder 212 can then identify the farthest tap reached by a pulse, calculate the distance traversed by the pulse as a fractional value of the total length, and encode that fractional value.

Consider the following example:
Total number of delay cells in first branch: 6
Resolution of each delay cell in first branch: 20 mV
Total delay of delay cells in first branch: 120 mV
Total number of delay cells in second branch: 4
Resolution of each delay cell in second branch: 30 mV
Total delay of delay cells in second branch: 120 mV
Best resolution $\psi$ in HPM: 10 mV
Total length ç of both branches in terms of best resolution $\psi$: 6 delay cells×(20 mV/10 mV)+4 delay cells×(30 mV/10 mV)=24
HPM-encoded output codes: 5-bit values (32 total values)
Target tap: $T_{2,3}$.

If a first pulse reaches as far as the target tap $T_{2,3}$, this means that the pulse is present at taps $T_{1,4}$ and $T_{2,3}$. This can be mapped into a distance traversed by the pulse in terms of the best resolution $\psi$ as 4×(20 mV/10 mV) (first branch)+3×(30 mV/10 mV) (second branch), which equals 17. Dividing this distance by the total length ç equals 17/24, or 0.708. Multiplying this fractional value by 32 (the total number of values represented by the 5-bit output codes) equals 0.708×32, or 22 (also expressed as 5'h16) after truncation. In this example, the 5'h16 value denotes the output of the encoder 212 when no error is present and the supply voltage is acceptable.

If a second pulse reaches as far as the tap $T_{1,4}$, this means that the pulse is present at taps $T_{1,4}$ and $T_{2,2}$. This can be mapped into a distance traversed by the pulse in terms of the best resolution $\psi$ as 4×(20 mV/10 mV) (first branch)+2×(30 mV/10 mV) (second branch), which equals 14. Dividing this distance by the total length ç equals 14/24, or 0.583. Multiplying this fractional value by 32 equals 0.583×32, or 18 (also expressed as 5'h12) after truncation. This can translate into an error of "−4" compared to the "no error" value of 5'h16.

If a third pulse reaches as far as the tap $T_{1,5}$, this means that the pulse is present at taps $T_{1,5}$ and $T_{2,3}$. This can be mapped into a distance traversed by the pulse in terms of the best resolution $\psi$ as 5×(20 mV/10 mV) (first branch)+3×(30 mV/10 mV) (second branch), which equals 19. Dividing this distance by the total length ç equals 19/24, or 0.792. Multiplying this fractional value by 32 equals 0.792×32, or 25 (also expressed as 5'h19) after truncation. This can translate into an error of "+3" compared to the "no error" value of 5'h16.

As can be seen here, evaluating the delay using parallel branches of a delay line with taps associated with different delay measurements can greatly increase the resolution of the HPM 118. Note that the use of two parallel branches is for illustration only. Three or more parallel branches could be used to obtain even finer resolution (at the expense of requiring a more complex encoder 212).

Although FIG. 2 illustrates one example of an HPM 118 with extended resolution and FIGS. 3A and 3B illustrate two examples of techniques for extending the resolution of an HPM 118, various changes may be made to FIGS. 2 through 3B. For example, the HPM 118 could include any number of delay cells (including zero) prior to the parallel branches, and the HPM 118 could include any number of parallel branches each having any number of delay cells. Also, the HPM 118 could include any number of latches at any number of taps in the branches. In addition, while FIGS. 3A and 3B illustrate two ways to effectively stagger the taps in the HPM 118, any other suitable arrangement or technique could be used to stagger the taps.

Figure 4:
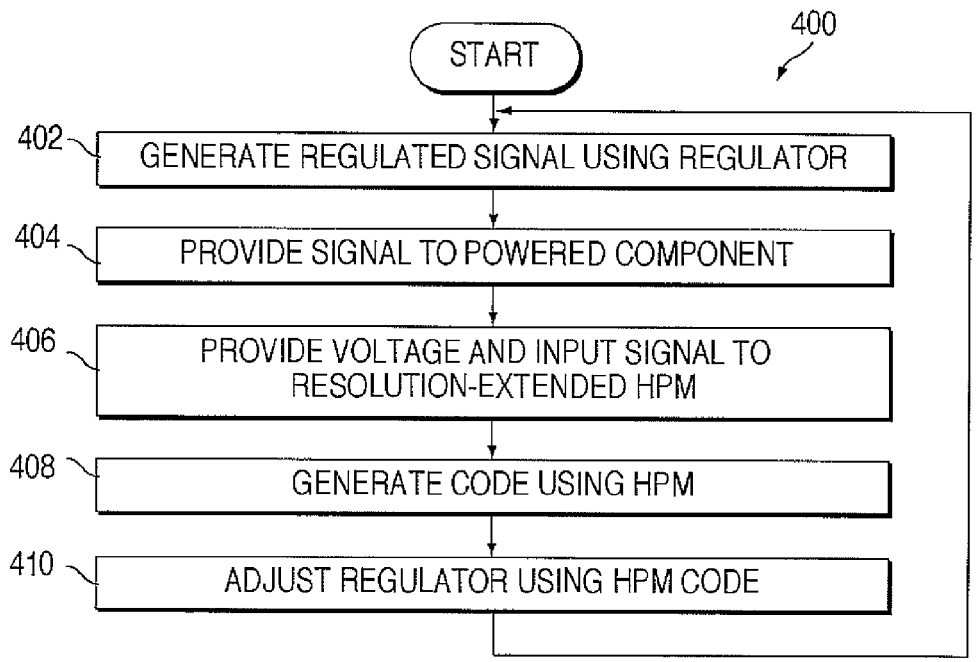
FIG. 4 illustrates an example method for powering a system using a hardware performance monitor with extended resolution according to this disclosure.

FIG. 4 illustrates an example method 400 for powering a system using a hardware performance monitor with extended resolution according to this disclosure. The embodiment of the method 400 shown in FIG. 4 is for illustration only. Other embodiments of the method 400 could be used without departing from the scope of this disclosure.

As shown in FIG. 4, a regulated signal is generated using a regulator at step 402. This could include, for example, generating a regulated output voltage using the voltage regulator 120 in the EMU 106. The voltage regulator 120 could generate the output voltage based on one or more control signals 110 from the powered component 102. The regulated signal is provided to the powered component at step 404.

A voltage and an input signal are provided to an HPM at step 406. This could include, for example, providing a clock signal having a frequency to be used by the core 104 to the HPM 118. This could also include providing the output voltage from the EMU 106 to logic gates forming the various delay cells in the HPM 118. The voltage provided to the delay cells in the HPM 118 could also be based on (but different than) the output voltage from the EMU 106. The HPM 118 is an extended-resolution HPM since taps in parallel branches of a delay line are not aligned, providing a higher resolution that the best resolution of each individual delay cell.

A code is generated using the HPM at step 408. This could include, for example, sending a high pulse through the delay line in the HPM 118. This could also include the various latches in the HPM 118 sampling and holding the outputs of various delay cells in the HPM 118. This could further include the encoder 212 encoding the outputs of the latches to generate the output code. As described above, in some embodiments, the encoder 212 operates to encode taps to delays corresponding to the minimum achievable delay measured by the HPM 118.

The regulator is adjusted by the APC based on the output code generated by the HPM at step 410. This could include, for example, the APC processing the difference between the HPM code and the target code over time. This generates controls signals 110 to be sent to the EMU 106. This could also include the EMU 106 making larger changes to the regulated output voltage when the pulse in the HPM 118 reaches a tap farther away from the target tap and smaller changes to the regulated output voltage when the pulse in the HPM 118 reaches a tap closer to the target tap. The improved resolution in at least part of the HPM 118 provided by the non-aligned taps can support finer adjustments to the supply voltage, which may be particularly useful when pulses are close to or at the target tap. The method 400 then returns to step 402 to continue generating the regulated signal using the adjusted regulator.

Although FIG. 4 illustrates one example of a method 400 for powering a system using an HPM with extended resolution, various changes may be made to FIG. 4. For example, while shown as a series of steps, various steps in FIG. 4 could overlap, occur in parallel, occur in a different order, or occur multiple times. As a particular example, the regulator may continuously operate to generate the regulated signal at steps 402-404. In parallel, the HPM 118 could operate to adjust the regulator at steps 406-410.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a delay line comprising first and second parallel branches each comprising multiple delay cells coupled in series at least some of which have an associated tap, the delay line configured to receive an input signal and to propagate the input signal in parallel through successive delay cells in the branches;
wherein each delay cell is configured with one of: a minimum delay and a longer than minimum delay, such that, at least in a target portion of the delay line, associated taps of the first and second parallel branches are not aligned;
sampling circuitry configured to sample the input signal at different taps in respective branches of the delay line and to output respective first and second sampled values; and
encoding circuitry configured to generate, based on the first and second sampled values from taps associated with at least the target portion of the delay line, an encoded delay value with an encoded delay resolution greater than a delay resolution corresponding to the minimum delay.

2. The apparatus of claim 1, wherein:
the first branch comprises delay cells that, at least in the target portion of the delay line, have the minimum delay; and
the second branch comprises delay cells that, at least in the target portion of the delay line, have the longer than minimum delay;
such that, at least in the target portion of the delay line, at least some taps in the first and second branches are not aligned.

3. The apparatus of claim 1, wherein:
the first branch comprises a first delay cell with the longer than minimum delay followed by successive delay cells with the minimum delay; and
the second branch comprises, delay cells with the minimum delay;
such that, at least in the target portion of the delay line, at least some taps in the first and second branches are not aligned.

4. The apparatus of claim 1, wherein the delay line further comprises:
multiple additional delay cells configured to delay the input signal and to provide the input signal to the first and second branches.

5. The apparatus of claim 1, further comprising:
power controller circuitry responsive to the encoded delay value to adjust a regulated voltage provided to a powered component by a voltage regulator.

6. The apparatus of claim 1, wherein the encoding circuitry is configured to generate the encoded delay value by calculating a distance traversed by a pulse through the first and second branches of the delay line, the distance expressed in terms of the encoded delay resolution.

7. The apparatus of claim 6, wherein the encoding circuitry is further configured to generate the encoded delay value by:
dividing the distance traversed by a total length of the first and second branches to generate a fractional value, the total length expressed in terms of the encoded delay resolution; and
determining the encoded delay value using the fractional value.

8. A system comprising:
a powered component including a hardware performance monitor (HPM); and
a voltage regulator configured to generate a regulated voltage for the powered component;
an adaptive voltage scaling (AVS) controller configured to adjust the generation of the regulated voltage by the voltage regulator based on a power control signal provided by the HPM;
wherein the HPM comprises:
a delay line comprising first and second parallel branches each comprising multiple delay cells coupled in series, at least some of which have an associated tap, the delay line configured to receive an input signal and to propagate the input signal in parallel through successive delay cells in the branches;
wherein each delay cell is configured with one of: a minimum delay and a longer than minimum delay, such that at least in a target portion of the delay line, associated taps of the first and second parallel branches are not aligned;
sampling circuitry configured to sample the input signal at different taps in respective branches of the delay line and to output respective first and second sampled values; and
encoding circuitry configured to generate, based on the first and second sampled values from taps associated with at least the target portion of the delay line, an encoded delay value with an encoded delay resolution greater than a delay resolution corresponding to the minimum delay;
power controller circuitry configured to generate the power control signal based on the encoded delay value.

9. The system of claim 8, wherein:
the first branch comprises delay cells that, at least in the target portion of the delay line, have the minimum delay; and
the second branch comprises delay cells that, at least in the target portion of the delay line, have the longer than minimum delay;
such that, at least in the target portion of the delay line, at least some taps in the first and second branches are not aligned.

10. The system of claim 8, wherein:
the first branch comprises a first delay cell with the longer than minimum delay followed by successive delay cells with the minimum delay; and
the second branch comprises, delay cells with the minimum delay;
such that, at least in the target portion of the delay line, at least some taps in the first and second branches are not aligned.

11. The system of claim 8, wherein the delay line further comprises:
multiple additional delay cells configured to delay the input signal and to provide the input signal to the first and second branches.

12. The system of claim 8, wherein the encoding circuitry is configured to generate the encoded delay value by calculating a distance traversed by a pulse through the first and second branches of the delay line, the distance expressed in terms of the encoded delay resolution.

13. The system of claim 12, wherein the encoding circuitry is further configured to generate the encoded delay value by:
dividing the distance traversed by a total length of at least the first and second branches to generate a fractional value, the total length expressed in terms of the encoded delay resolution; and
determining the encoded delay value using the fractional value.

14. The system of claim 8, wherein the powered component includes the AVS controller.

15. A method comprising:
propagating an input signal through a delay line comprising first and second parallel branches, each parallel branch comprising multiple delay cells coupled in series at least some of which have an associated tap;
wherein each delay cell is configured with one of: a minimum delay and a longer than minimum delay, such that, at least in a target portion of the delay line, associated taps of the first and second parallel branches are not aligned;
sampling the input signal at different taps in respective branches of the delay line and, outputting respective first and second sampled values; and
generating, based on the first and second sampled values from taps associated with at least the target portion of the delay line, an encoded delay value with an encoded delay resolution greater than a delay resolution corresponding to the minimum delay.

16. The method of claim 15, wherein:
the first branch comprises delay cells that, at least in the target portion of the delay line, have the minimum delay; and
the second branch comprises delay cells that, at least in the target portion of the delay line, have the longer than minimum delay;
such that, at least in the target portion of the delay line, at least some taps in the first and second branches are not aligned.

17. The method of claim 16, wherein the first branch comprises a first delay cell with the longer than minimum delay followed by successive delay cells with the minimum delay; and the second branch comprises, delay cells with the minimum delay;

such that, at least in the target portion of the delay line, at least some taps in the first and second branches are not aligned.

18. The method of claim 15, further comprising:
delaying the input signal prior to propagating the input signal through the first and second branches of the delay line.

19. The method of claim 15, wherein generating the encoded delay value comprises:
calculating a distance traversed by a pulse through the first and second branches of the delay line, the distance expressed in terms of the encoded delay resolution.

20. The method of claim 19, wherein generating the encoded delay value further comprises: dividing the distance traversed by a total length of the first and second branches to generate a fractional value, the total length expressed in terms of the encoded delay resolution; and determining the encoded delay value using the fractional value.

\* \* \* \* \*